July 31, 1951  H. I. BECKER  2,562,690
MAGNETIC GYROSCOPE
Filed March 23, 1950
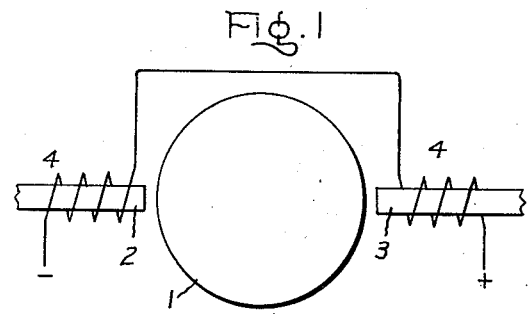
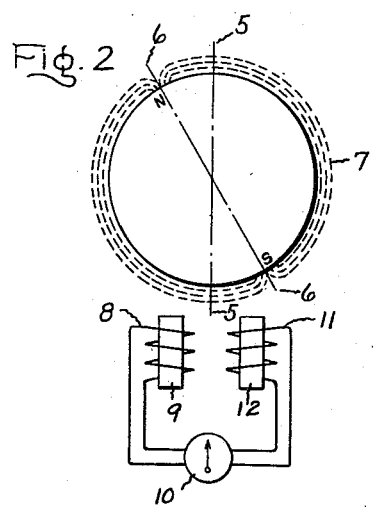
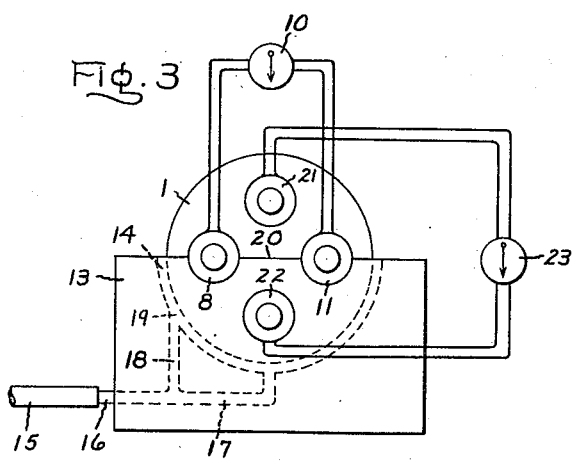
Inventor
Howard I. Becker
by  *signature*
His Attorney Patented July 31, 1951

2,562,690

UNITED STATES PATENT OFFICE 2,562,690

MAGNETIC GYROSCOPE

Howard I. Becker, Vischers Ferry, N. Y., assignor to General Electric Company, a corporation of New York Application March 23, 1950, Serial No. 151,340

3 Claims. (Cl. 33—204)

This invention relates to gyroscopes and, in particular, to the use of a magnetized steel ball rotating within an air bearing as a gyroscope.

The usual gyroscope, as known to the art, comprises a rotating element suspended by an intricate gimbal system that permits a steady position of the rotating element irrespective of the position of the supporting base. This type rotating element and its support is intricate and expensive.

It is well-known that a rotating ball suspended by some low friction medium will spin about a single axis. For instance, an air inflated ball on water will spin for a long time about a single axis. The use of a large ball suspended by an air cushion within a cup-shaped base is also well-known to the art. Such a ball may be spun by an air jet playing on one side of it and by allowing compressed air to escape from the cup-shaped base beneath the ball, the ball will rotate freely with a minimum of friction drag.

The difficulty in using a spin ball of this type as a gyroscope lies in the trouble of determining the true spin axis.

Methods have been used to determine the spin axis of the rotating ball, such as visually determining the axis and then coating this axis with a phosphorescent paint. By using intricate systems involving mirrors and a beam of light, the variation of a supporting base relative to the predetermined axis of rotation of a ball can be used to impart a signal that indicates this displacement.

It has also been found that by grinding a flat spot on the ball and then rotating it in an air bearing that there will be a continual precessing until the axis of rotation passes through the minor axis created by the flat spot. Unfortunately, this precessing process sometimes takes three or four hours to come to a steady state.

It is an object of this invention to provide a new and improved gyroscope.

It is a further object of this invention to provide a new and improved gyroscope in which it is not necessary to use an expensive and cumbersome gimbal system.

Broadly, this invention comprises the use of a magnetized steel ball riding in an air bearing. A system of inductance coils is arranged in relation to the spin axis of the rotating ball wherein equal voltages are induced in each coil by the residual magnetism of the ball when the coils are substantially equi-distant from the spin axis of the ball.

These, and other objects and advantages of this invention, will become apparent and the invention will be more clearly understood from the following description referring to the accompanying drawing, and the features of novelty which characterize this invention will be pointed out with particularity in the claims annexed to and forming a part of this specification.

Referring to the drawing, Fig. 1 is a schematic diagram showing the arrangement for magnetizing a ball; Fig. 2 is a diagrammatic arrangement of a ball suspended by an air cushion adjacent a pair of inductance coils; while Fig. 3 is a diagrammatic representation of the operative structure of this improved gyroscope.

In Fig. 1 of the drawing, a steel ball 1 is shown positioned between the ends of soft iron cores 2 and 3. Coil 4 is wrapped around cores 2 and 3 and sets up a magnetic flux, when energized, capable of magnetizing ball 1 and providing it with a residual magnetism.

In Fig. 2, ball 1 is shown rotating about its axis of rotation or spin axis 5, while the magnetic axis is indicated at 6. Flux lines 7 are shown passing around the ball between the magnetic poles. A coil 8 having a soft iron core 9 is shown positioned adjacent the axis of rotation 5 of ball 1. As the ball rotates, coil 8 cuts magnetic lines of force which induce a voltage in it that is indicated by voltmeter 10. Coil 11, which is provided with a soft iron core 12, is shown positioned on the opposite side of axis of rotation 5 of the steel ball.

Under the conditions shown in Fig. 2, with coils 8 and 11 spaced substantially an equal distance from axis of rotation 5, the voltage induced in each of the coils is equal and voltmeter 10 will show a zero reading.

If axis of rotation 5 of ball 1 is shifted clockwise, then the rate of flux lines cut by coil 11 is greater than the rate cut by coil 8; consequently, a higher voltage is induced in coil 11 than in coil 8.

The operating theory described in the preceding paragraphs may be utilized to operate a gyroscope. Specifically, by inserting coils 8 and 11 in a cup-shaped base 13 which might, in turn, be secured to the deck of a ship, for instance, then any tilt in the deck would displace coils 8 and 11 relative to the spin axis of the ball. This tilting, in turn, sets up a voltage differential in the coils which could be employed to operate a servo system that would maintain a gun mount or a sextant platform at an even keel.

For the utilization of the operating principles of this invention, in a preferred embodiment a hollow ball 1 of any suitable dimensions having good residual magnetic properties is suspended in a base 13 having a cup-shaped opening 14. An air supply from any suitable source (not shown) is conducted by a pipe or tube 15 to an inlet 16 in base 13. From inlet 16, the air is divided into two paths. One path 17 conducts air to the center of cup 13, while the other path 18 conducts air to a nozzle 19 that directs a jet of air tangentially against ball 1.

As the air comes into base 13, ball 1 is buoyed by the air in path 17, and it is rotated by the jet of air from nozzle 19. When the ball comes up to speed, its axis of rotation will be substantially perpendicular to a plane that includes air jet 19 and that bisects ball 1; consequently, the axis of rotation or spin axis will be at about point 20.

Coils 8 and 11 are mounted on a horizontal line that passes through the axis of rotation 20 of ball 1, while a second set of coils 21 and 22 are mounted on a vertical line passing through the axis of rotation 20. A voltmeter 23 measures the differential voltage set up in coils 21 and 22.

It is important that each of the coils be adjustably mounted on base 13, since the position of the axis of rotation 20 may change. It is necessary to adjust the coils after operating speed has been obtained by ball 1 so that the differential voltage between the coils of the horizontal pair and the coils of the vertical pair is zero.

With this arrangement as described, if base 13 is twisted so that axis 20 is closer to coil 8 than it is to coil 11, or if base 13 is tilted so that axis 20 is closer to coil 21 than it is to coil 22, a differential voltage is induced, which is detected respectively in either the voltmeter 10 or in voltmeter 23. If both twisting and tilting exist at the same time, this movement is reflected both in voltmeter 10 and voltmeter 23 at the same time.

The differential voltage indicated by either or both of the meters is a signal of a magnitude proportional to the amount of displacement. This signal may be used to guide the manual manipulation of base 13 to restore it to its original position relative to the axis of rotation of the ball, or the signal may be sent into a servo mechanism of a type that is well-known to the art wherein automatic manipulation can take place that will restore base 13 to its initial position.

With a servo mechanism responsive to the correction signal set up by the differential voltage in each pair of coils, the base 13 can be maintained at a constant horizontal plane. This horizontal plane might be the site of a sextant or a gun mount which thus can be maintained at a desired operating position.

Modifications of this invention will occur to those skilled in the art and it is desired to be understood, therefore, that this invention is not to be limited to the particular arrangement disclosed, but that the appended claims are meant to cover all the modifications which do not depart from the spirit and scope of this invention.

What I claim as new and desire to secure by Letters Patent of the United States is:

1. A magnetic gyroscope comprising a magnetized ball having a magnetic axis and a spin axis, means for supporting said ball for rotation about said spin axis, a pair of inductance coils mounted in mutually spaced apart relation and in inductive relation with said magnetized ball, and means for indicating unequal changes in the voltages induced in said coils when said ball rotates, whereby the displacement of said coils from normal positions relative to said spin axis is detected by said induced voltage indicating means.

2. A magnetic gyroscope comprising a magnetized ball having a magnetic axis and a spin axis, means for supporting said ball for rotation about said spin axis, a pair of coils, means mounting said coils in inductive relationship with said magnetized ball so that a proportional voltage is induced in each of said coils in response to rotation of said ball, a differential voltmeter connected in circuit with said coils for indicating the displacement of said spin axis relative to the axes of said coils.

3. A magnetic gyroscope comprising a magnetized ball having a magnetic axis and a spin axis, means including an air bearing for supporting said ball for rotation about said spin axis, means including an air stream directed tangentially against said ball for rotating said ball about said spin axis, a first pair of inductance coils supported in a horizontal plane by said supporting means, means for indicating the differential voltage induced in said first pair of coils by said rotating ball, a second pair of inductance coils supported in a vertical plane by said supporting means, and means for measuring the differential voltage induced in said second pair of coils by said rotating ball, whereby any displacement of said supporting means relative to said spin axis of said ball is detected by said differential voltage indicating means.

HOWARD I. BECKER.

REFERENCES CITED

The following references are of record in the file of this patent:

UNITED STATES PATENTS

| Number | Name | Date |
| --- | --- | --- |
| 1,864,801 | Chaplin | June 28, 1932 |